(12) United States Patent
Lu et al.

(10) Patent No.: US 6,414,597 B1
(45) Date of Patent: Jul. 2, 2002

(54) ELECTRONIC IDENTIFICATION SYSTEM EXTENDED-RANGE READER

(75) Inventors: Gui-Yang Lu, Upland; Sammy E. Wooldridge, Alta Loma, both of CA (US)

(73) Assignee: Avid Marketing, Inc., Norco, CA (US)

( * ) Notice: Subject to any disclaimer, the term of this patent is extended or adjusted under 35 U.S.C. 154(b) by 690 days.

(21) Appl. No.: 08/667,418

(22) Filed: Jun. 21, 1996

(51) Int. Cl.$^7$ ................................................. H04Q 1/00
(52) U.S. Cl. ..................................... 340/572.7; 340/10.1
(58) Field of Search ........................ 340/825.69, 825.72, 340/825.54, 572, 573, 10.1, 572.7; 235/380

(56) References Cited

U.S. PATENT DOCUMENTS

| | | | | |
|---|---|---|---|---|
| 3,645,528 A | * | 2/1972 | Cornell | 340/572 |
| 3,891,980 A | * | 6/1975 | Lewis | 340/572 |
| 4,782,342 A | * | 11/1988 | Walton | 340/572 |
| 4,827,395 A | * | 5/1989 | Anders | 340/825.54 |
| 4,888,474 A | * | 12/1989 | Walton | 235/350 |
| 5,159,332 A | * | 10/1992 | Walton | 340/825.54 |

* cited by examiner

*Primary Examiner*—Brian Zimmerman
(74) *Attorney, Agent, or Firm*—Robert E. Malm

(57) ABSTRACT

An extended-range reader for use in identifying the tag of an object. The reader includes a winding of conducting wire for generating an interrogating magnetic field. The winding may be either a coil assembly consisting of a plurality of coils spaced at intervals along a common axis or a solenoid. The winding is limited to those having values of D/L less than four where D is the smallest transverse dimension of the winding and L is the length. The winding is adapted to receive a structure within the winding for providing objects a passageway through the winding. The axis of the winding may be either straight or curved. To improve the magnetic field generating capability of the winding, a magnetic shunt encircling the winding can be added. Also included is a structure within the winding for providing objects a passageway through the winding, the structure having openings for object ingress and egress. Where the structure is intended to provide a natural environment for the objects, the structure, except for the openings, can be made pervious or impervious to liquids or gases.

10 Claims, 2 Drawing Sheets

ELECTRONIC IDENTIFICATION SYSTEM EXTENDED-RANGE READER

BACKGROUND OF THE INVENTION

This invention relates to cooperative electronic identification systems in which the identifying agency and the object to be identified cooperate in the identification process according to a prearranged scheme. More specifically, the invention relates to systems consisting generically of an interrogator-responsor (or "reader") inductively coupled to a transponder (or "tag") where the reader is associated with the identifying agency and the tag is associated with the object to be identified.

Such systems are being used or have the potential of being used for identifying fish, birds, animals, or inanimate objects such as credit cards. Some of the more interesting applications involve objects of small size which means that the transponder must be minute. In many cases it is desirable to permanently attach the tag to the object which means implantation of the device in the tissues of living things and somewhere beneath the surfaces of inanimate objects.

In most cases, implantation of the tag within the object forecloses the use of conventional power sources for powering the tag. Sunlight will usually not penetrate the surface of the object. Chemical sources such as batteries wear out and cannot easily be replaced. Radioactive sources might present unacceptable risks to the object subject to identification.

One approach to powering the tag that has been successfully practiced for many years is to supply the tag with power from the reader by means of an alternating magnetic field generated by the reader. This approach results in a small, highly-reliable tag of indefinite life and is currently the approach of choice.

Electronic identification systems of the type described above are typically used to identify objects that are more or less stationary. The reader is held in close proximity to the implanted tag and the identification of the object is read out. Moving objects, even though they are constrained to travel along a specific path, may be difficult or impossible to identify with present-day readers. The problem is that in the time it takes to read out an identification code, the object may have traveled beyond the range of the reader.

SUMMARY OF THE INVENTION

The invention is an extended-range reader for use in identifying the tag of a moving object. The reader comprises a winding of conducting wire for generating an interrogating magnetic field. The winding may be either a coil assembly consisting of a plurality of coils spaced at intervals along a common axis or a solenoid. The winding is limited to those having values of D/L less than four where D is the smallest transverse dimension of the winding and L is the length. The winding is adapted to receive a structure within the winding for providing objects a passageway through the winding. The axis of the winding may be either straight or curved. To improve the magnetic field generating capability of the winding, a magnetic shunt encircling the winding can be added.

Another element of the invention is a structure within the winding for providing objects a passageway through the winding, the structure having openings for object ingress and egress. Where the structure is intended to provide a natural environment for the objects, the structure, except for the openings, can be made pervious or impervious to liquids or gases.

DESCRIPTION OF THE PREFERRED EMBODIMENTS

Figure 1:
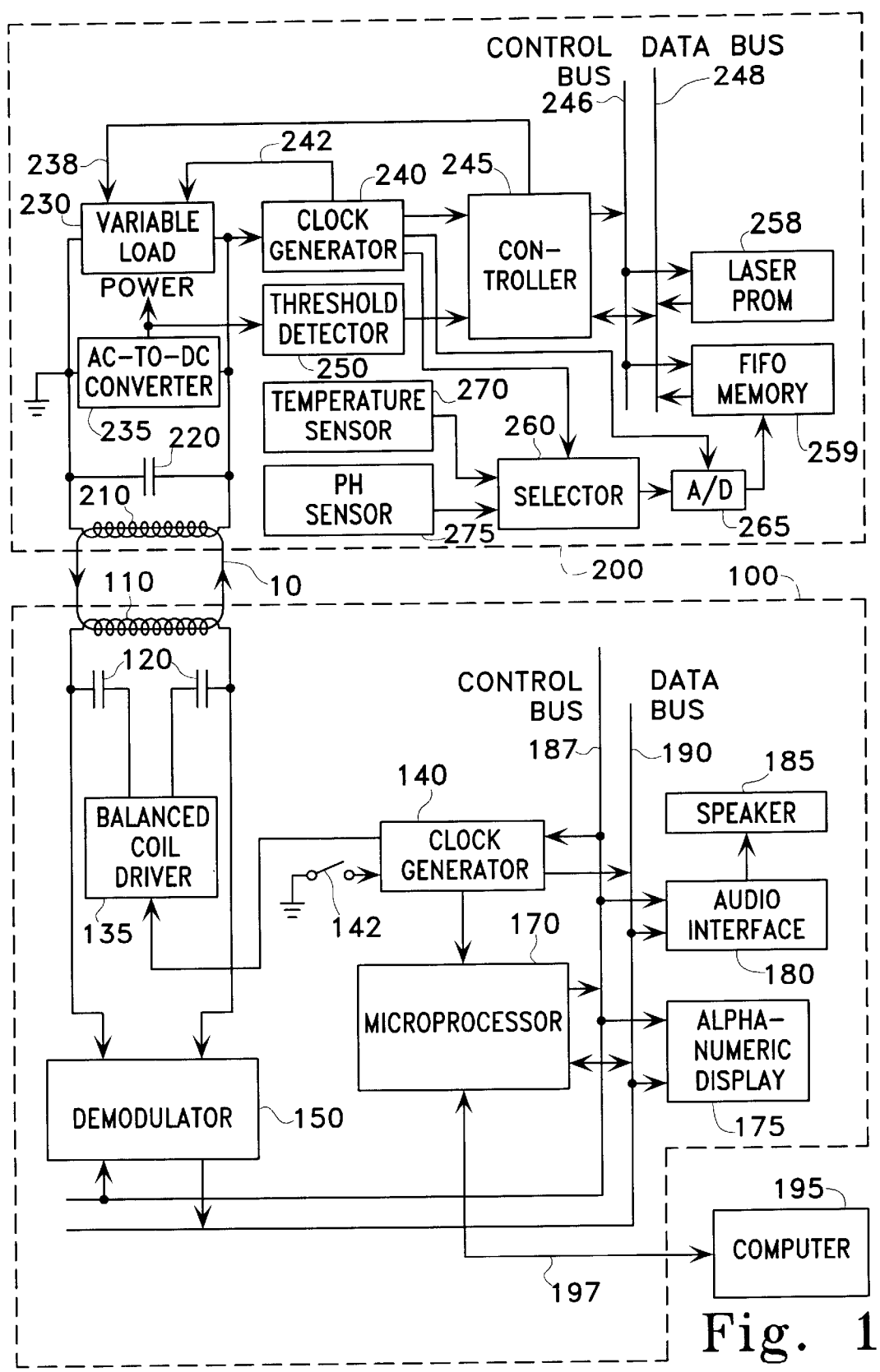
FIG. 1 is a block diagram of the reader and tag.

The functional block diagrams of the reader and tag are shown in FIG. 1. The reader 100 interrogates the tag 200 by generating a reversing magnetic field 10 by means of the wound wire coil 110 that is inductively coupled to a similar coil 210 in the tag 200. The coil 110 in series with capacitor pair 120 is driven by the double-ended balanced coil driver 135 with a periodic signal of appropriate frequency supplied by the clock generator 140. Typically, the driving frequency is in the range from 100 kHz to 400 kHz.

A typical design for balanced drivers suitable for driving the coil 110 and capacitors 120 utilizes two complementary pairs of series-connected power metal-oxide-silicon field-effect transistors (International Rectifier IRF9530 and IRF520). The source-drain junctions of the two pairs of power transistors are connected to opposite ends of the coil 110 through the two capacitors 120. The two transistor pairs are driven by complementary waveforms, the second waveform being an inverted version of the first.

The two capacitors 120 have equal capacitances, the capacitance being chosen so that the combination of the coil and capacitor pair constitutes a series resonant circuit at a desired driving frequency.

The clock generator 140 is comprised of a crystal-controlled oscillator and divider chains of conventional design. The oscillator frequency is chosen such that all required driving frequencies can be obtained by integer divisions.

In response to an interrogation by the reader 100, the tag 200 causes the variable load 230 that is inductively coupled to the reader coil 110 by means of coil 210 to vary in accordance with one or the other of two patterns, one pattern being associated with the transmission of a 0 and the other being associated with the transmission of a 1. The loading pattern is manifested at the reader by a variation in the voltage across the reader coil 110. The demodulator 150 performs those operations necessary to determine whether the voltage pattern during a bit period corresponds to a 0 or a 1 and periodically communicates this determination to the microprocessor 170 by means of the data bus 190.

The tag data that derives from this information together with operational information is caused by the microprocessor 170 to be visually displayed on alpha-numeric display 175. This same information is made available audibly to the user in the form of audio signals and/or artificial speech by means of the audio interface 180 and the speaker 185.

The microprocessor 170 exercises control over the clock generator 140, the demodulator 150, the alpha-numeric display 175, and the audio interface 180 by means of the control bus 187. Data is exchanged between the microprocessor 170 and the clock generator 140, the demodulator 150, the alphanumeric display 175, and the audio interface 180 by means of the data bus 190.

An external digital computer 195 can exercise control over and exchange data with the microprocessor 170 by means of the standard RS-232 data link 197.

The circuits and devices which provide the basis for the reader design are conventional and are fully described in a number of textbooks having to do with the design of communication systems and equipment. Specific examples of reader designs are contained in U.S. Pat. No. 4,333,072 to Beigel and U.S. Pat. No. 4,730,188 to Milheiser which are hereby incorporated by reference.

The tag 200, when in the proximity of and inductively-coupled to the reader 100, extracts power from the alternating magnetic field 10 established by the reader coil 110 by means of the multi-turn coiled conductor 210 in parallel with the capacitor 220, the combination constituting a resonant circuit at one of the reader's driving frequencies.

The variable load 230 is connected across the coil-capacitor combination thereby providing a means for varying the load on the balanced coil driver 135 in the reader 100 resulting from the inductive coupling of the reader and tag coils. The variable load 230 is resistive in the preferred embodiment thereby achieving the greatest possible effectiveness in absorbing power from the reversing magnetic field and in communicating with the reader. Other less desirable embodiments could use loads that are inductive, capacitive, or some combination of inductive, capacitive, and resistive.

The communication capability of the reader 100 and the tag 200 are critically dependent on the characteristics of the reader coil 110 and the tag coil 210. The number of turns for the reader coil should be as large as possible so that the magnetic field created by the reader coil is a large as possible. On the other hand, the resistance of the reader coil 110 (proportional to the number of turns) must not become so large as to be a substantial mismatch to the driving impedance and thereby impede the transfer of power to the tag.

The design of the reader coil becomes even more complicated when the reading of tags attached to moving objects is the objective. For purposes of illustration, we will consider the problem of identifying fish traveling at 4 m/s through a 0.6 m pipe. Reading a tag typically requires 0.04 to 0.08 s. A fish may travel 4×0.08 or 0.32 m or more during the identification process. Thus, the interrogating magnetic field should extend over a distance of perhaps about 0.3 m.

Figure 2:
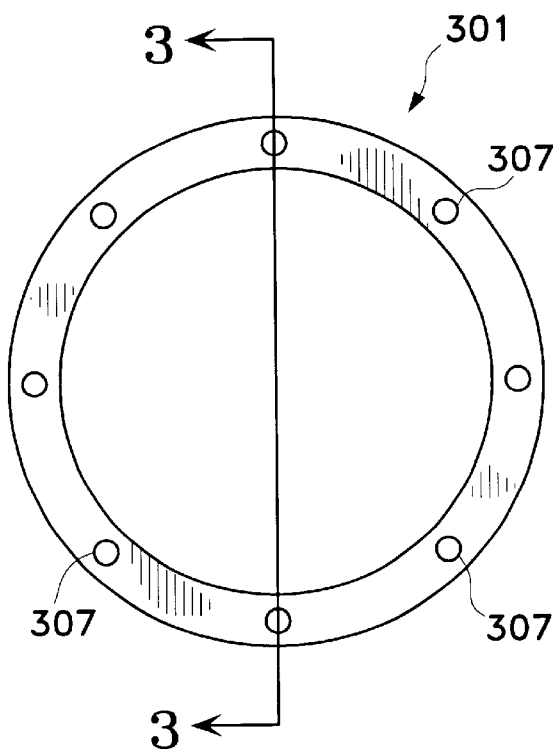
FIG. 2 is the end view of an embodiment of the invention showing a winding and a structure providing objects a passageway through the winding.
Figure 3:
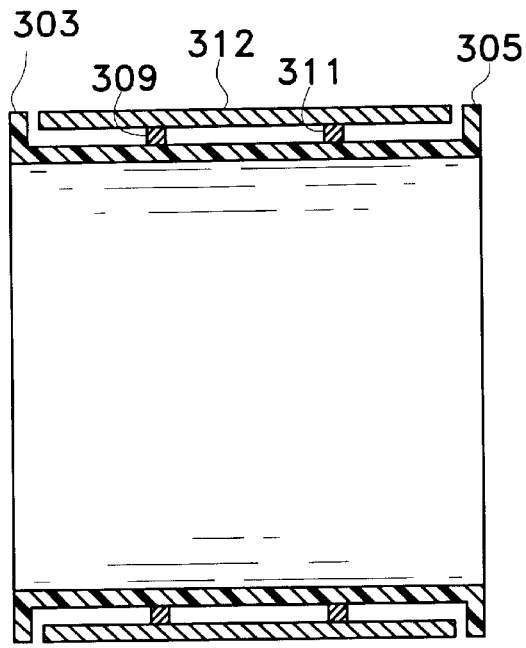
FIG. 3 is the cross-sectional view of the embodiment of FIG. 2 where the winding is a coil assembly consisting of two coils.

The end view of one embodiment of a coil configuration which provides an interrogating magnetic field for a distance of 0.64 m in a 0.6 m pipe section 301 is shown in FIG. 2. The cross-sectional view is shown in FIG. 3. The pipe section 301 is intended to be part of a pipe system carrying water and tagged fish. Flanges 303 and 305 with tapped holes 307 provide the means for attachment of the pipe section to adjoining pipes in the pipe system. The pipe section 301 must be made of a non-magnetic material in order that the generated magnetic field can penetrate into the interior of the pipe section.

Coils 309 and 311 are positioned symmetrically as shown and spaced approximately 0.3 m apart. Each coil is wound with 20½ turns of 75/40 Litz wire, Teflon extruded with S.NYLEZE 24TPF. The resulting interrogating magnetic field will extend a distance of approximately 0.17 m on either side of the two coils with sufficient intensity to interrogate tags. Thus, fish carrying tags that travel from one end of the pipe section 301 to the other can be identified. The pipes that connect to pipe section 301 need not be non-magnetic since there is no requirement that the magnetic field be able to penetrate into the interior of these connecting pipes.

It may be desirable in some applications to enclose the coils with a magnetic shunt 312 of iron, steel, or ferrite in order to increase the magnetic field levels within the pipe section and also to shield external things from the interrogating magnetic field.

Figure 4:
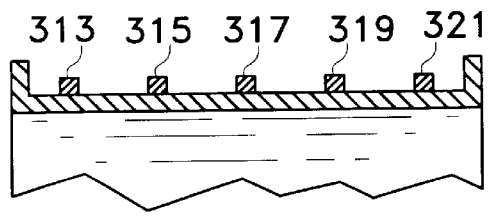
FIG. 4 is a portion of the cross-sectional view of the embodiment of FIG. 2 where the winding is a coil assembly consisting of five coils.

The embodiment shown in FIGS. 2 and 3 utilizes two coils 309 and 311 connected either in series or in parallel to generate an interrogating magnetic field within the pipe section. Although two coils is the simplest embodiment of the invention, more than two coils can be used as shown in FIG. 4. More than two coils, particularly with the coils spaced apart in a non-uniform fashion as illustrated by the five coils 313, 315, 317, 319, and 321 in FIG. 4 can provide greater uniformity of the magnetic field in the region of interest.

Figure 5:
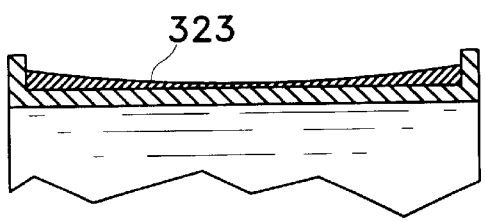
FIG. 5 is a portion of the cross-sectional view of the embodiment of FIG. 2 where the winding is a solenoid with a non-uniform number of turns per unit length.

Increasing the number of coils until all of the coils are in contact with each other results in the equivalent of the solenoid 323 shown in FIG. 5 which is a continuous winding that extends over the same region as the individual coils of FIG. 4. The number of turns per unit distance along the pipe section can vary as indicated in the figure so that the magnetic field is more uniform throughout the pipe section.

Figure 6:
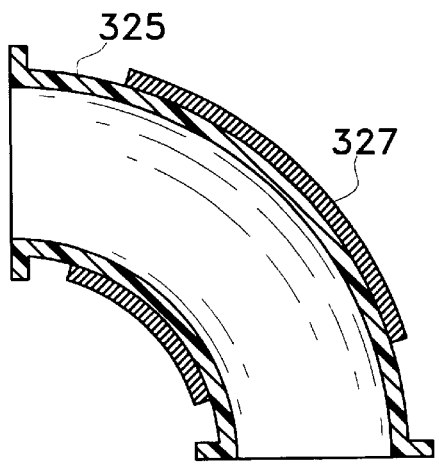
FIG. 6 is a cross-sectional view of an embodiment of the invention wherein the axis of a solenoid is curved to adapt to a curved structure providing objects a passageway through the solenoid.

In FIG. 6 is shown an embodiment based on a curved pipe section 325. The solenoid 327 also curves to conform with the curved pipe section.

The example described above focuses on fish swimming in water that is flowing through a pipe section. The invention is intended for application, however, in a wider variety of applications wherein there is a requirement that moving objects be identified. Thus, a more general description of the invention begins with the specification of a structure which provides a passageway for objects and is appropriate for controlling the movement of specified objects for the purpose of identifying them as they pass through the passageway.

The passageway is specified by specifying its cross-sectional shape, its length, and the curvature (if any) of its axis. The axis of a passageway is a line that passes through the centroids of the cross-sectional areas of the passageway along its length. The passageway is specified in the context of the objects that are to be identified and their environment, the possible objects being fish, insects, birds, animals, humans, or inanimate objects and the objects' environments being either gaseous or liquid.

The invention consists of (1) the structure through which the objects move and by means of which the objects are guided through an interrogating magnetic field and (2) a winding of conducting wire which encircles the structure and which, when energized with an electric current, produces an interrogating magnetic field in the passageway.

Of particular importance insofar as efficiency considerations are concerned is that the magnetic field produced by the winding has its largest value within the passageway.

As pointed out above, the winding can take the form of a coil assembly consisting of two or more coils or a solenoid (i.e. a stretched out single coil) shaped to conform to the outer surface of the passageway. The form taken by the passageway depends on the nature of the objects and the nature of their environment. In the case of fish and a water environment, the passageway could be a trough, open on top, since gravity will constrain the water to the trough and fish are naturally constrained to water. For animals, birds, and insects living in air, the walls of the passageway could be made of a mesh since the air does not need to be confined within the passageway. For inanimate objects being transferred by compressed air from one location to another, the walls of the passageway must be nonpervious to air.

The axis of the passageway can be straight or curved, depending on the application.

An optional element of the invention is a magnetic shunt made of iron, steel, or ferrite encircling the winding, thereby reducing the reluctance of the magnetic path external to the passageway and increasing the magnetic field within the passageway.

The primary applications of the extended-range reader is to perform the identification process for moving objects, and for such applications, the value of D/L should be less than about 4, D being the minimum transverse dimension of the winding and L being the length.

The number of turns on the tag coil 210 also should be as large as possible in order to maximize the inductively-generated voltage across the coil. Again caution must be exercised in choosing the number of turns so that the power transfer between reader and tag is not adversely affected.

The alternating voltage appearing across the coil 210 as a result of being inductively coupled to the reader coil 110 is converted to direct current by means of the AC/DC converter and voltage regulator 235 which supplies all of the power required by the tag circuitry.

The alternating voltage appearing across the coil 210 provides a reference frequency for the clock generator 240 which supplies all of the clocking signals required by the tag circuitry. Another embodiment utilizes the alternating coil voltage to stabilize a voltage-controlled oscillator which would then act as the source for all clocking signals.

The controller 245 controls all of the operations performed by the tag circuitry by means of control bus 246 and data bus 248. A clock signal for the controller 245 is supplied by the clock generator 240.

The threshold detector 250 produces a signal when the voltage from the AC/DC converter and voltage regulator 235 reaches the level required for reliable operation of the tag circuitry. The threshold detector 250 is a simple comparison circuit that uses a Zener diode as a reference voltage.

The signal from the threshold detector 250 serves to reset the controller 245 which waits for a first predetermined period of time (measured by a clock cycle counter in the controller) for the purpose of allowing the voltage transient associated with the inductive coupling of an externally-generated magnetic field to the tag coil 210 to die down to the point where either power absorption by the tag can be detected by the reader or amplitude modulation by the programming unit can be detected by the tag.

A message is transmitted by the controller 245 by applying a square wave signal of appropriate frequency to the variable load 230 for each bit of the message.

The controller 245 retrieves for transmission all but the sensor data portion of the message from the non-volatile memory 258.

The laser-programmable read-only memory (laser PROM) 258 contains data which uniquely identifies the tag and is unalterable because of the nature of the laser PROM. The manufacturer utilizes this data in providing warranty and diagnostic services to the user. The laser PROM is permanently programmed at the time of manufacture by utilizing a laser beam to make or break connections in the device.

In the embodiment shown in FIG. 1, the controller 245 obtains the sensor data from a first-in/first-out (FIFO) memory device 259 where the data was stored as a result of the sensor selector 260 connecting the A/D converter 265 sequentially first to temperature sensor 270 and then to PH sensor 275.

In the absence of a message transmission from the controller 245, the variable load 230 is dormant and does not appreciably load the resonant circuit 210, 220. When the controller transmits a message over line 238 to the variable load 230, the variable load applies a load to the resonant circuit 210, 220 in accordance with a frequency-shift-keying (FSK) technique. A message bit "1" causes a "mark" frequency signal to be selected. A "0" selects a "space" frequency signal. The selection of the "mark" frequency signal causes the load to be turned on or off depending on whether the "mark" frequency signal is high or low. Similarly, the "space" frequency signal causes the load to be turned on or off depending on the high and low states of the "space" frequency signal. The "mark" and "space" frequency square-wave signals are derived from the reader driving frequency and supplied by the clock generator 240 to the variable load 230 over lines 242.

Since the "mark" and "space" frequencies are phase-coherent with the magnetic field driving frequency, the reader may advantageously extract the information from the power absorption signal by means of a coherent demodulation technique thereby realizing the increased communication efficiency of coherent frequency-shift keying (CFSK) as compared to non-coherent frequency shift keying (NCFSK).

The "mark" and "space" frequencies are chosen small enough that the sidebands resulting from the amplitude modulation of the driving-frequency signal are not attenuated by more than say 3 dB with respect to the driving frequency by the reader resonant circuit 110, 120. The spacing of the "mark" and "space" frequencies should ideally be an integer times the bit rate where the integer is preferably equal to or greater than two. For a driving frequency of 400 kHz and a bit rate of 5 kHz, typical values for the "mark" and "space" frequencies are 50 kHz and 40 kHz respectively. Note that the difference 10 kHz is equal to the integer 2 times the bit rate.

It will be obvious to one skilled in the art that other modulation techniques could be used by the tag 200. For example, the tag could utilize on-off-keying (OOK) whereby the variable load 230 turns the load off when a "0" is transmitted and turns the load on and off when a "1" is transmitted (or vice versa) in accordance with whether a square wave of predetermined frequency supplied by the clock 240 is high or low.

Phase-shift-keying (PSK) in either the fully-coherent (CPSK) or differentially-coherent (DCPSK) versions could also be used. Coherent phase-shift-keying would result if the variable load 230 turned the load on or off in accordance with whether the square wave described above was high or low respectively when a "0" was transmitted and turned the load on or off when the square wave was low or high respectively when a "1" was transmitted (or vice versa).

Differentially-coherent phase-shift-keying would result if the variable load 230 turned the load on and off in the same way as it was during the previous bit period when a "0" is transmitted and in the opposite way when a "1" is transmitted.

What is claimed is:

1. A reader for use in identifying an object, the reader comprising:

a winding of conducting wire selected from the group consisting of (1) a coil assembly consisting of a plurality of electrically-connected coils spaced at intervals along a common axis, the coil assembly having a length L, the smallest transverse dimension of the coil assembly being D, and (2) a solenoid having a length L, the smallest transverse dimension of the solenoid being D, the value of D/L for the winding being less than four, the winding being adapted to receive a structure within the winding for providing objects a passageway through the winding.

2. The reader of claim 1 wherein the axis of the winding is straight, the axis of the winding being a line that passes through the centroids of the cross-sectional areas of the winding along the length of the winding.

3. The reader of claim 1 wherein the axis of the winding is curved, the axis of the winding being a line that passes through the centroids of the cross-sectional areas of the winding along the length of the winding.

4. The reader of claim 1 wherein the winding comprises a coil assembly.

5. The reader of claim 1 wherein the winding comprises a solenoid.

6. The reader of claim 1 further comprising:

a magnetic shunt encircling the winding.

7. The reader of claim 1 further comprising:

a structure within the winding for providing objects a passageway through the winding, the structure having openings for object ingress and egress.

8. The reader of claim 7 wherein the structure, except for the openings, is impervious to liquids.

9. The reader of claim 7 wherein the structure, except for the openings, is impervious to gases.

10. The reader of claim 7 wherein the structure is pervious to gases.

* * * * *